May 10, 1949.  D. S. YOUNG  2,469,538
PIPE COUPLING
Filed April 26, 1947  2 Sheets-Sheet 1
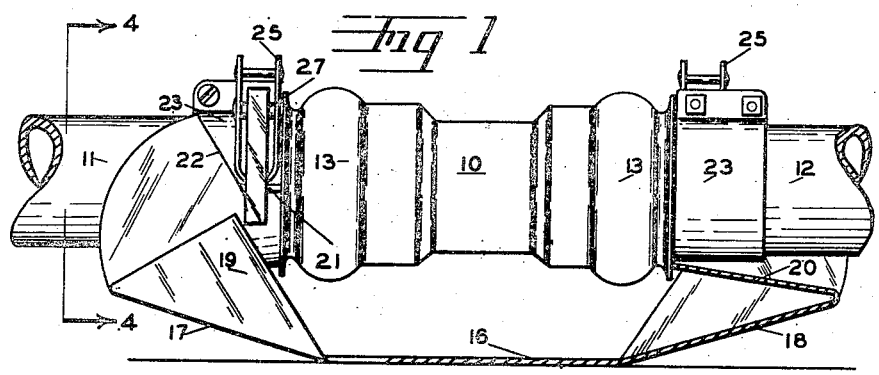
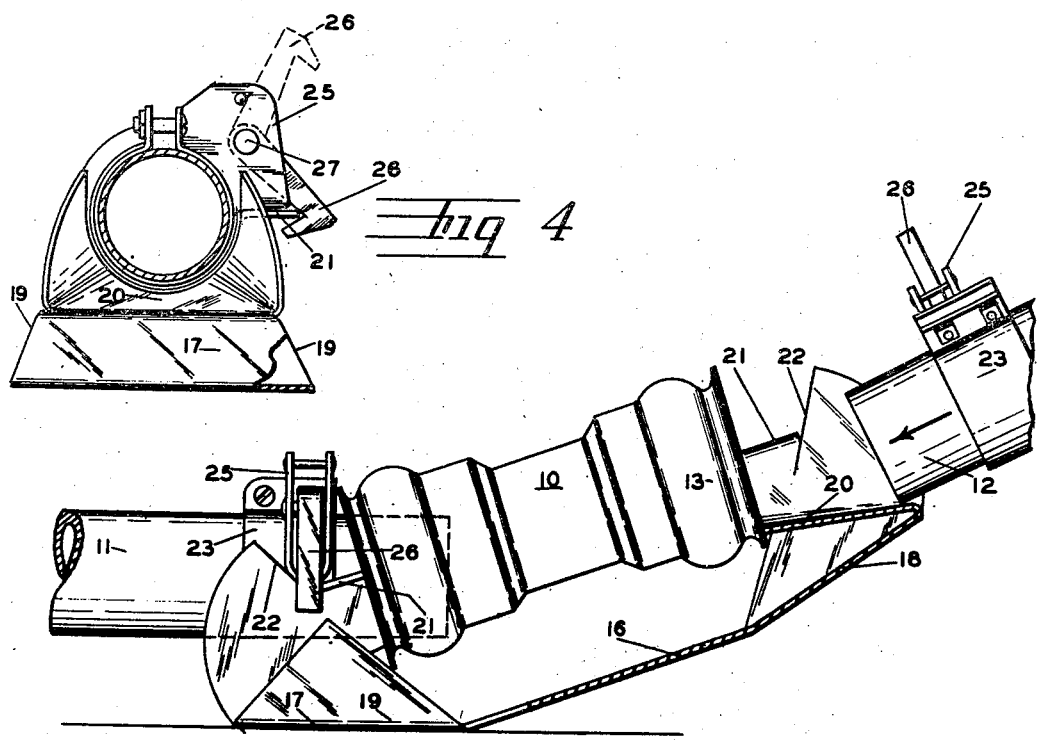
INVENTOR
DORRIS S YOUNG
ATTORNEY May 10, 1949.　　　D. S. YOUNG　　　2,469,538
PIPE COUPLING
Filed April 26, 1947　　　2 Sheets-Sheet 2
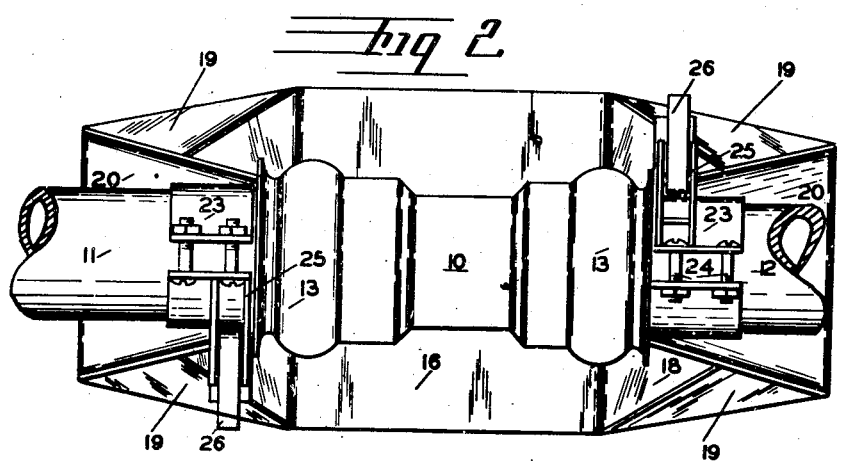
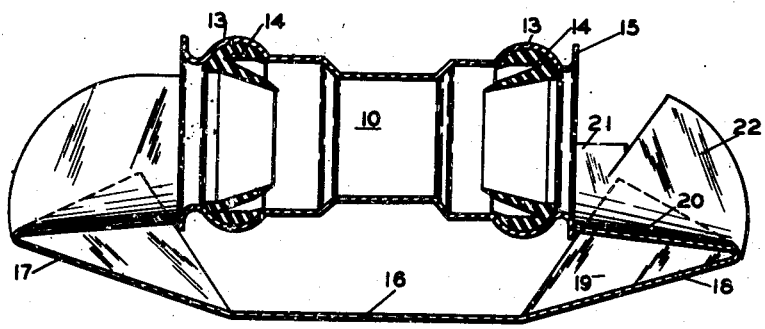
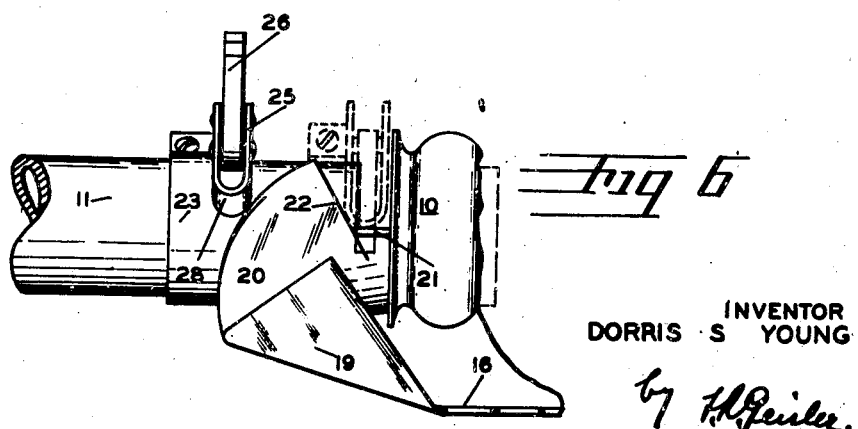
INVENTOR
DORRIS S YOUNG
ATTORNEY Patented May 10, 1949

2,469,538

UNITED STATES PATENT OFFICE 2,469,538

PIPE COUPLING

Dorris S. Young, Wilsonville, Oreg.

Application April 26, 1947, Serial No. 744,201

5 Claims. (Cl. 285—1)

This invention relates to coupling means whereby pipe sections, and particularly water pipe sections, can be quickly and easily joined, through the intermediary of couplers, to form a fluidtight pipeline.

More specifically, this invention relates to coupling means for connecting sections of pipe employed in demountable surface pipelines in irrigation systems.

An object of this invention is to provide a coupling for use between two sections of pipe, and especially surface irrigation pipe, by means of which the two sections can be quickly and easily coupled and quickly and easily uncoupled without the use of tools.

Another object of this invention is to provide a coupling between pipe sections which will enable a watertight but flexible connection to be maintained between pipe sections.

A special object of this invention is to provide a coupler which will enable two pipe sections to be coupled together merely by manipulating one of the pipe sections and without touching the coupler.

An additional object is to provide an improved quick coupling means for a pair of pipe sections which will lock the sections together and prevent any longitudinal or axial movement of one section away from the other while maintaining a slightly flexible and watertight connection between the pipe sections.

A further object of this invention is to provide coupling means which will not only prevent longitudinal movement of one pipe section with respect to the other but which at the same time and by the same means, will prevent one pipe section from being given any rotational movement with respect to the other.

A still further object of this invention is to provide a simple, practical coupling means between pipe sections in a surface pipeline which will permit the coupled sections to be dragged along the ground when the pipeline is moved longitudinally, without causing dirt or other debris to be collected in the coupling.

Another object is to provide a coupling which will automatically tip up into position to facilitate receiving a second pipe section after one pipe section has been connected to the coupling and rests on said coupling.

The manner in which these objects and other advantages are attained with the improved coupling of the present invention will become apparent from the following description of the invention with reference to the accompanying drawings.

In the drawings:

Fig. 1 is a side elevation of the entire coupling illustrating the same in a pipeline with two pipe sections connected therewith, a portion of the coupling being shown in medial longitudinal section in order to show the structure of the base portion of the coupler more clearly;

Fig. 2 is a corresponding top plan view of the entire coupling;

Fig. 3 is a vertical medial longitudinal section of the coupling alone, with the two pipe sections entirely removed therefrom;

Fig. 4 is an end elevation of the coupler and a sectional elevation of the end of a pipe coupled thereto, taken on line 4—4 of Fig. 1;

Fig. 5 is a side elevation of the coupler illustrating the position of the coupler when attached to only one pipe section and preparatory to the connecting up of the other pipe section with the coupler; and Fig. 6 is a fragmentary side elevation of the coupler and one of the pipe ends showing in full line the position of the pipe end at the start of the locking operation and indicating in broken line the position of the same pipe end when in final locked position.

Referring first to Figs. 1 and 3, the coupler comprises a tubular body portion of varying diameter, indicated in general by the reference character 10. The internal diameter of the intermediate section of the body portion corresponds approximately to the internal diameter of the pipe sections 11 and 12 which are to be connected to the coupler. Near the end of the tubular body portion 10 rubber gasket pockets 13 are formed with an arcuate internal surface designed to accommodate the sealing gaskets 14 (Fig. 3), which gaskets are of a well known type, the shape of the gaskets being shown in Fig. 3. The extreme ends of the tubular body portion 10 are preferably flared outwardly, as indicated at 15, in order to facilitate the inserting of the pipe ends into the corresponding ends of the coupling.

The tubular body 10 of the coupling is mounted on a sled-like base, which, in the form shown in the drawings, consists of a broad strip of sheet metal having a central flat ground section 16, the length of which section is slightly less than the length of the tubular body 10, as apparent from Figs. 1, 2 and 3, and the width of which is preferably considerably greater than the width of any portion of the tubular body 10. This flat ground section 16 joins upwardly sloping sections 17 and 18 of the base at each end respectively. These upwardly sloping sections 17 and 18 are shaped in general as shown in Fig. 2 and their side edges are folded upwardly and inwardly to form triangular supporting webs 19 for the sides of a curved, flaring, trough-like guideway 20 located at each end of the coupler and leading into the ends of the tubular body 10 respectively. The purpose of these guideways 20, as apparent, is to guide the ends of the pipe sections into the corresponding ends of the tubular body 10 when the pipe sections are to be coupled. The guideways 20 are welded to the ends of the tubular body 10 and also welded to the triangular side webs 19.

I have found it practical and convenient to have the guideways 20 integral with the end sections 17 and 18 of the base respectively, and in fact to make the entire coupler, with the exception of the tubular body portion 10, out of a single sheet of metal properly cut and shaped. However, if preferred, separate pieces of metal can be used for the different portions and welded together to form an integral assembly of the general shape illustrated. The side walls of the guideways 20 curve upwardly as shown in the drawings. An oblique cut is made in one of the side walls of each guideway and the intervening portion of that wall between the oblique cut and the adjacent end of the tubular body portion 10 is deformed and bent outwardly to form a locking lip 21, the function of which will be explained later. The forming of this portion of the wall into the outwardly extending locking lip 21 leaves an edge or shoulder 22 which slopes downwardly and obliquely towards the adjacent entrance into the tubular body 10. The purpose of this will also be presently explained. Preferably the side walls of the two guideways 20 which are cut in this manner are on opposite sides of the axes of the pipes respectively.

On each pipe end 11 and 12 a collar 23 is tightly clamped, preferably by a pair of clamping bolts 24 connecting flanges at the adjacent ends of the collar, as shown in Fig. 2. A double hook-supporting bracket 25, in the form of a metal loop having a pair of side portions extending in planes substantially perpendicular to the pipe axis, is mounted on the collar 23. A latching hook 26, the shape of which is shown in Fig. 4, is pivotally and loosely mounted on a stub shaft or pin 27 supported on the two side portions of the bracket 25.

When a pipe end, for example the end of pipe 11, is to be connected to the coupling, the hook 26 is swung to raised or open position and the pipe section 11, if necessary, is rotated counter-clockwise (facing towards the right in Fig. 6), until the rounded bottom portion of the loop 28 connecting the two side portions of bracket 25 clears the top point of the side wall of the guideway 20. Then, when the loop 28 has reached the top end of the edge or shoulder 22 (Fig. 6), the pipe section 11 is given partial rotation in the opposite (or clockwise) direction. This latter rotation of the pipe section 11 accomplishes two results, namely; it causes the rounded bottom loop portion 28 of the bracket 25 to engage the obliquely-sloping shoulder or edge 22, and as this bottom of the bracket slides downward, along the edge 22 the end of the pipe 11 is forced inwardly into the tubular body 10 of the coupling by the rotation of the pipe, as indicated by the broken lines in Fig. 6; and secondly, this rotation of pipe 11 causes the hook 26 to drop into latching engagement with the locking lip 21 (see also Fig. 4).

Due to the fact that the coupling rests on the ground on its broad base 16, the rotating of the pipe section 11, during the connecting of the pipe 11 to the coupling, will not cause rotation of the coupling, and thus the end of pipe 11 will be forced into the coupling without any difficulty due to engagement of the bracket loop 28 with the sloping edge or shoulder 22, as previously explained and as illustrated in Fig. 6. This is an important feature of my invention since it enables one person, by holding a pipe section, to connect it to the coupling while the coupling is resting freely on the ground and unattached, thus saving time as well as effort.

The final locking engagement of the hook 26 with the locking lip 21, with the cooperation of the bracket 25 and shoulder 22, locks the pipe section 11 in such manner as not only to prevent any further rotational movement of the pipe with respect to the coupling but also to prevent any axial or longitudinal movement of the pipe with respect to the coupling. In various other more or less similar coupling devices in which longitudinally-extending locking hooks are employed, separate or special means is required to prevent rotational movement of the pipe with respect to the coupling, in addition to the customary locking of the pipe to the coupling. However, by having my locking hook extending in a transverse plane, and by providing the cooperating elements on the guideway wall, I accomplish both objects simultaneously with the same means. This affords a convenience as well as an economy.

When one pipe, thus the pipe section 11, has been connected to one end of the coupling in the manner just described with reference to Fig. 6, and this pipe is placed on the ground while the operator prepares to attach the next pipe section 12 in turn to the coupling, the weight of the end of the pipe section 11, supported on the end of the coupling, will cause the entire coupling to tip up somewhat in the manner illustrated in Fig. 5. This facilitates the inserting of the other pipe section 12 into the coupling since the operator holding pipe section 12 is not obliged to stoop over and hold the pipe 12 parallel to the ground and close to the ground, but can place the pipe in starting position for locking engagement merely by tilting the end of the pipe 12 into the position shown in Fig. 5. Thus the upwardly sloping end portions 17 and 18 of the coupling base facilitate the attaching of the second pipe to the coupling which is an added convenience and time saver especially when all the work of connecting up the pipeline is being done by one person.

When both pipe sections are locked to the coupler, as illustrated in Figs. 1 and 2, and an entire pipeline assembly is connected up in this manner, it is often desirable to drag the whole pipeline longitudinally on the ground to a different location. Where this is done the time and work involved in disconnecting the separate pipe sections, moving them separately, and then again connecting them, can be saved. With ordinary couplers the dragging of the coupled pipe sections over the ground would result in dirt and debris being collected by the couplers, which dirt and debris would ultimately be forced into the coupler openings so that in such case the dragging of the pipeline over the ground is impractical and undesirable. However, with my improved coupling the end portions 17 and 18 of the sled-like base perform a second important function in that they facilitate the sliding of the coupler, and with it the supporting ends of the connected pipe sections, over the ground. This feature of my invention will be apparent from Fig. 1.

Various modifications could be made in my coupling without departing from the principle of my invention. Thus the base portion of the coupling could be made in the form of two separate and parallel spaced runners in place of the single broad surface 16 and end portions 17 and 18 illustrated. However, as previously indicated, I consider it preferable to make the entire base and guideway portions out of a single sheet of metal. Further modifications could also be made in the mounting of the transversely-extending hook on each pipe section. It is not my intention to limit my invention otherwise than as set forth in the claims.

I claim:

1. In a pipe coupling of the character described, a coupler having a main tubular body portion, a sled-like base mounting for said main tubular body portion adapted to support said tubular body portion at a spaced distance above the surface of the ground, said base having a horizontal central section and upwardly inclined end sections, a trough-like guideway extending from the lower part of each end of said main tubular body portion, the outer ends of said guideways joining the outer ends of said upwardly inclined end sections of said sled-like base respectively, whereby the weight of a pipe in one of said guideways would exert a tendency to cause said coupling to tip upwardly and rest on the inclined end base section beneath that guideway, and facilitate the insertion of a pipe in the other guideway and end of said tubular body portion.

2. In a pipe coupling of the character described the combination of a coupler having a main tubular body portion, a sled-like base mounting for said main tubular body portion adapted to support said tubular body portion at a slight distance above the surface of the ground, said base having a horizontal central section and upwardly inclined end sections, a flaring trough-like guideway sloping downwardly extending from the lower part of each end of said main tubular body portion, the outer ends of said guideways joining the outer ends of said upwardly inclined end sections of said sled-like base respectively, a side wall of each of said guideways having a latch-engaging element, a pair of pipe sections having ends adapted to be inserted in the ends of said main tubular body portion respectively, and latching means on each of said pipe sections.

3. In a pipe coupling of the character described the combination of a coupler having a main tubular body portion, a sled-like base mounting for said main tubular body portion adapted to support said tubular body portion at a slight distance above the surface of the ground, a flaring trough-like guideway sloping downwardly extending from the lower part of one end of said main tubular body portion, a side wall of said guideway having a shoulder extending downwardly and obliquely towards the adjacent end of said main tubular body portion, a latch-engaging element on the outside of said wall between the lower end of said shoulder and the adjacent end of said main tubular body portion, a pipe section having an end adapted to be inserted in said main tubular body portion, a hook-supporting bracket secured to the outside of said pipe section, said bracket extending outwardly on said pipe section in a plane substantially perpendicular to the axis of the pipe section, said bracket adapted to engage the downwardly-extending shoulder on the wall of said guideway when said pipe section is inserted into that end of said main tubular body portion, and a latching hook in said hook-supporting bracket extending in a plane substantially perpendicular to the axis of the pipe section and adapted to engage said latch-engaging element on the guideway wall.

4. In a pipe coupling, the combination of a coupler having a main tubular body portion, a base mounting for said main tubular body portion adapted to support said tubular body portion at a slight distance above the surface of the ground, a trough-like guideway extending from the lower part of each end of said main tubular body portion, a side wall of each of said guideways having a shoulder extending downwardly and obliquely towards the adjacent end of said main tubular body portion, a locking lip extending laterally and outwardly on said side wall between the lower end of said shoulder and the adjacent end of said main tubular body portion, a pair of pipe sections having ends adapted to be inserted in the ends of said main tubular body portion respectively, a hook-supporting bracket secured to the outside of each pipe section, said brackets extending outwardly on each pipe section in a plane substantially perpendicular to the axis of the pipe section, said brackets adapted to engage the downwardly-extending shoulder on the wall of the corresponding guideway when a pipe section is inserted into the corresponding end of said main tubular body portion, and a latching hook in each hook-supporting bracket extending in a plane substantially perpendicular to the axis of the pipe section and adapted to engage the corresponding locking lip on the guideway wall.

5. A pipe coupling of the character described including a coupler having a main tubular body portion, a sled-like base mounting for said main tubular body portion adapted to support said tubular body portion at a spaced distance above the surface of the ground, said base having a horizontal central section and upwardly inclined end sections, a flaring trough-like guideway sloping downwardly, extending from the lower part of each end of said main tubular body portion, the outer ends of said guideways joining the outer ends of said upwardly inclined end sections of said sled-like base respectively, a side wall of each of said guideways having a laterally-extending locking lip, a pair of pipe sections having ends adapted to be inserted in the ends of said main tubular body portion respectively, a hook-supporting element secured to the outside of each pipe section, and a latching hook in each hook-supporting element extending in a plane substantially perpendicular to the axis of the pipe section and adapted to engage the corresponding locking lip on the guideway wall.

DORRIS S. YOUNG.

REFERENCES CITED

The following references are of record in the file of this patent:

UNITED STATES PATENTS

| Number | Name | Date |
|---|---|---|
| 1,162,473 | Gedge | Nov. 30, 1915 |
| 1,945,293 | Pierce | Jan. 30, 1934 |
| 2,244,396 | Kellaher | June 3, 1941 |